Jan. 31, 1956  H. R. ABBRECHT  2,732,577
BRUSH
Filed July 31, 1950  2 Sheets-Sheet 1

INVENTOR.
HERMANN R. ABBRECHT
BY
ATTORNEYS

Jan. 31, 1956  H. R. ABBRECHT  2,732,577
BRUSH
Filed July 31, 1950  2 Sheets-Sheet 2

INVENTOR.
HERMANN R. ABBRECHT
BY
Whittemore, Hulbert & Belknap
ATTORNEYS

United States Patent Office 2,732,577
Patented Jan. 31, 1956

2,732,577

BRUSH

Hermann R. Abbrecht, Birmingham, Mich.

Application July 31, 1950, Serial No. 176,835

15 Claims. (Cl. 15—171)

The present invention relates to a brush and has as its object to provide a brush element which can be manufactured as a continuous strip of any desired length suitable for a wide variety of uses.

In general, the brush comprises a core of strip form over which the filler material is folded or doubled so as to provide series of bristles at opposite sides of the core. In order to retain the bristles in properly assembled relation with the core, elongated retainer members are provided adjacent the edge or edges of the strip opposite to the folded portions of the filler material. These retainers may conveniently be in the form of relatively stiff wire. The retainers are held in place by prongs or tangs formed on the core and bent rearwardly around the retainers. Preferably, the core is in the form of a channel and the filler material is folded around the outside of the channel with the folded portion of the filler material located at the bottom wall of the channel.

In order to clarify the terms used herein, the edge, side, or portion of the core around which the filler material is doubled is referred to as the rear thereof. Accordingly, the opposite edge side or portion of the core beyond which the free ends of the bristles or other filler material extend, is the front thereof. Where the core is of channel shape, the tangs are thus bent outwardly of the channel, and rearwardly or toward the rear of the core. Where the core is essentially a single strip (as will subsequently be described in conjunction with Figure 7) the tangs are bent laterally outwardly from the plane or surface of the strip, and thence rearwardly thereof. By employing these terms, the use of terms of orientation such as upwardly, downwardly, or the like, is avoided.

With the foregoing general remarks in mind it is an object of the present invention to provide a brush characterized by its simplicity, the economy with which it may be produced, and its efficiency in use. Brushes of this type are commonly shaped into circular or helical formation and operated in high speed power driven rotation. The brush disclosed herein is particularly well adapted for this use and is stable at extremely high speed operation.

It is accordingly a further object of the present invention to provide a brush construction particularly adapted to operate efficiently in high speed rotary operation.

It is a feature of the present invention to provide a brush comprising a core of channel shape providing for flexibility in design so as to provide a pair of rows of filler ends which may be parallel, converging, diverging, closely spaced, or widely separated, or any proper combination of the foregoing, all without the necessity of substantially increasing the weight of the filler supporting structure.

It is a further feature of the present invention to provide a brush of the character described in which the filler material may be disposed uniformly and continuously in strict parallelism in the case of a straight brush section, or in strict radial disposition in the case of circular or helical formation.

It is a further feature of the present invention to provide a brush of the character described in which the filler material is separated at and adjacent its folded portion to provide a tufted brush.

Other objects and features of the invention will become apparent as the description proceeds, especially when considered in conjunction with the accompanying drawings, wherein.

Figure 1:
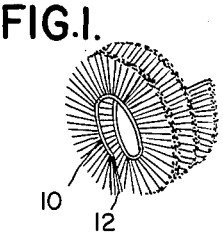
Figure 1 is a fragmentary perspective view of a brush produced by coiling an elongated brush section into helical formation.

Referring now to Figure 1 there is illustrated one use to which the brush constructed in accordance with the present invention may be put. The brush as illustrated in this figure comprises a brush supporting construction 10 and filler material 12, the construction 10 being coiled into a helix. This helix may be a tight helix with adjacent convolutions of the supporting construction 10 in abutment or adjacent convolutions may be spaced apart.

Figure 2:
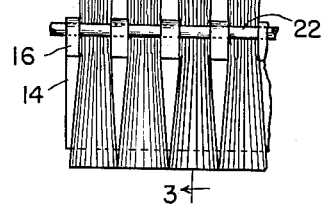
Figure 2 is an enlarged fragmentary side elevation of a portion of brush section.
Figure 3:
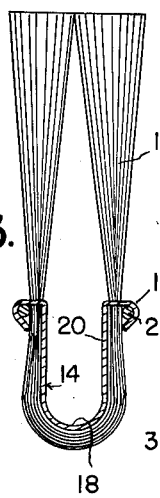
Figure 3 is a section on the line 3—3, Figure 2.

Referring now to Figures 2 and 3 the detailed construction of the elongated brush is illustrated. As seen in these figures, the brush comprises a core 14 which may be formed of flat metal stock, extruded plastic, paper products, fabric or the like. In a preferred form of the invention flat metal stock is employed. The core is formed into channel shape and is provided adjacent the free edges of the channel with tangs 16. The filler material 12 may be any conventional filler material such for example as hair, wire, or plastic, or the like. The filler material is folded or doubled around the outside of the channel, with the fold of the filler material located over the bottom wall 18 of the channel. Tangs 16 are formed at the free edge of the side walls 20 of the channel.

In order to retain the filler material in the position illustrated in the figures, elongated retainers 22 are provided. These retainers may be formed of metal or other suitable material and excellent results are obtained when the retainers 22 are in the form of fairly stiff or rigid wire. However, the retainers 22 need not be of circular cross-section but instead may if desired be relatively flat. However, it is preferred to provide the retainers 22 of rounded cross-section, whether circular or flat.

According to present conventional practice, filler material has been retained inside a channel shaped support with the folded or doubled portion thereof receiving a supporting wire. The wire has been retained in the channel by prongs or the like, extending inwardly from the side walls of the channel. In high speed operation it has been established that this wire has movement relative to the walls of the channel radially with respect thereto, with certain important disadvantages. In the first place, the relative movement between the intermediate wire and the outer channel resulted in wear and breaking of the filler elements. In the second place, movement of the wire radially outwardly of the channel permitted corresponding movement of filler elements with the result that accurate concentricity of the active ends of the filler elements was lost. It was found that definite limits as to speed of rotation were imposed on these prior constructions. According to the present invention the filler material is supported outside of the core and is firmly interlocked therewith by means integral with the core itself. Accordingly, brushes constructed in accordance with the present invention may be operated at substantially higher speeds than has previously been considered possible.

Figure 4:
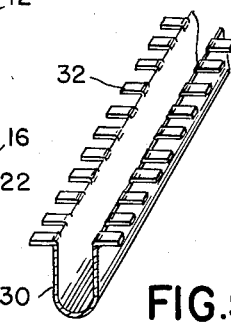
Figure 4 is a fragmentary perspective view of one form of core section.

Referring now to Figure 4 there is illustrated one form of core element. In this figure the core 30 is illustrated as of channel shape and is provided along the free edges of the side walls of the channel with outwardly extending tangs 32 which may be bent rearwardly to engage and support an elongated retainer such as the wire 22 illustrated in Figures 2 and 3.

Figure 5:
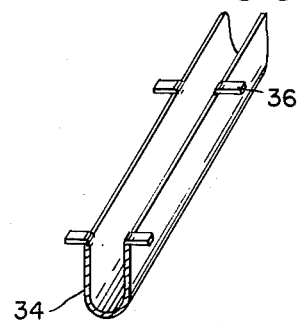
Figure 5 is a fragmentary perspective view illustrating a modified form of core section.

In Figure 5 there is illustrated a similar construction which differs from that illustrated in Figure 4 primarily in that the channel shaped core 34 is provided with relatively few and relatively widely spaced retainer supporting tangs 36.

Figure 6:
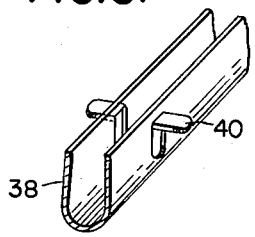
Figure 6 is a fragmentary perspective view illustrating another modified form of core section.

Referring now to Figure 6 there is illustrated a modified construction in which the channel shaped core 38 is provided with tangs 40 which are struck out from the material of the side walls of the channel. The tangs 40 are adapted to be bent rearwardly around retainer members such as the wire 22 shown in Figures 2 and 3.

Figure 7:
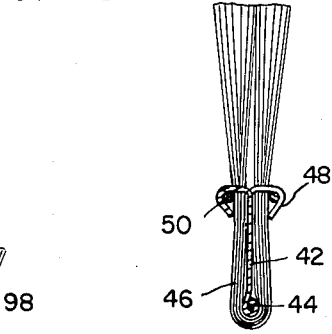
Figure 7 is a transverse section through a modified form of brush.

Referring now to Figure 7 there is illustrated a simplified construction which nevertheless embodies the essential features of the present invention. In accordance with this embodiment of the invention the core 42 may be in the form of a single flat strip. If desired, one edge of the strip may be turned over or beaded as indicated at 44, to provide a smoothly rounded surface over which the filler material 46 is folded or doubled. At its opposite edge the core 42 is provided with a series of retainer supporting tangs 48 adapted to be bent rearwardly around elongated retainer members 50 to retain the filler material 46 in place.

Figures 8, 9:
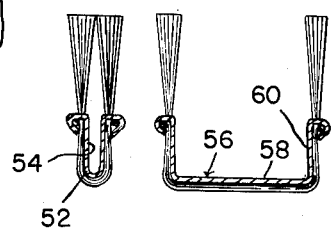
Figures 8 and 9 are transverse sectional views through modified brush constructions illustrating the flexibility of design as regards width of the brush.

Referring now to Figures 8 and 9 there is illustrated the flexibility of design permitted by the present construction. In Figure 8 the core member 52 is illustrated as having side walls 54 which are very closely spaced. In Figure 9 the core member 56 is shown as provided with a relatively wide bottom wall 58 so that its side walls 60 are widely spaced.

Figure 10:
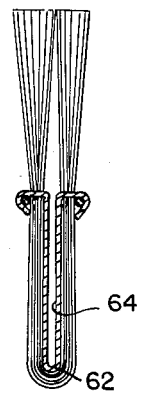
Figures 10 and 11 are transverse sectional views through modified forms of brushes illustrating the flexibility of design as regards depth of the filler material supporting structure.
Figures 11, 17:
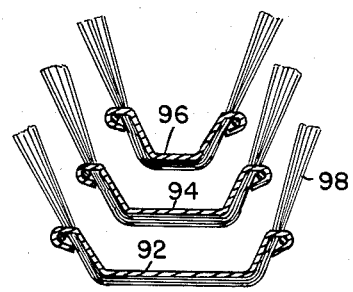
Figure 17 is a transverse sectional view through an assembly of cooperating nested brush sections.

Referring now to Figures 10 and 11 there is illustrated the flexibility of design permitted by the present construction as regards depth of the filler material supporting construction. In Figure 10 there is illustrated a core 62 having side walls 64 of very considerable height. In Figure 11 the core 66 has side walls 68 which are relatively shallow.

Comparing Figures 8, 9, 10 and 11, it will be observed that the brush construction may be very narrow or very wide as measured transversely of the brush, and the brush supporting structure may be very deep or very shallow. This design is possible without substantially increasing the weight of the brush or the material which goes into the filler material supporting structure, and is to be contrasted with the unwieldable and impractical constructions which would be necessary to accomplish roughly equivalent results with the type of brush construction in which a filler material supporting wire or element is located within a channel shaped member.

Figure 12:
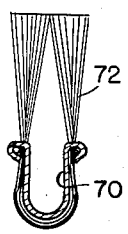
Figures 12–16 are transverse sections through modified forms of brushes illustrating flexibility of design as regards angular disposition of the filler material.
Figure 13:
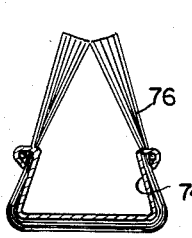
Figure 14:
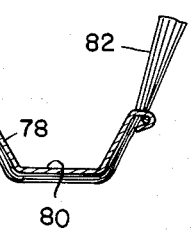
Figure 15:
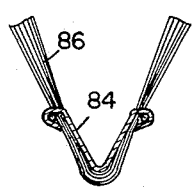
Figure 16:
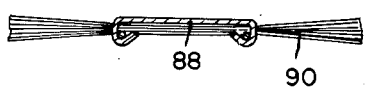

Referring now to Figures 12–16 there is illustrated the flexibility of design afforded by the present invention as regards disposition of the filler elements. In Figure 12 the side walls 70 of the core are illustrated as parallel, thus providing two parallel arrays of bristles or filler material 72. In Figure 13 the side walls 74 of the core are illustrated as converging inwardly, thus providing corresponding converging arrays of bristles or filler material 76. In Figure 14 the side walls 78 of the core are illustrated as diverging outwardly and as initially separated by a relatively wide bottom wall 80. This construction provides widely spaced and outwardly diverging arrays of bristles or filler material 82. In Figure 15 the core comprises essentially a pair of outwardly diverging side channel walls 84, thus providing closely spaced but outwardly diverging rows or arrays of bristles or filler material 86. In Figure 16 an extreme condition is illustrated in which the core 88 is flat and the rows or arrays of bristles or filler material 90 extend outwardly at an angle of substantially 180 degrees to each other.

Referring now to Figure 17 there is illustrated a useful assembly of brushes constructed in accordance with the present invention. In this figure there is shown an outer channel shaped core 92 having a relatively wide bottom wall. Nesting within the core 92 is a second core 94 having a somewhat narrower bottom wall. Received within the core 94 is a third core 96 having a still narrower bottom wall. As illustrated in this figure, the side walls of all of the cores diverge outwardly to provide closely massed filler material 98, but it will of course be appreciated that the side walls may if desired, be parallel or converging. Alternatively, the inclination of the side walls of the channel shaped cores may vary so as to provide massed arrays of filler material which are themselves converging, parallel, or diverging.

Figure 18:
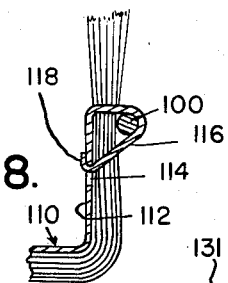
Figure 18 is a fragmentary transverse sectional view illustrating an interlock construction for the retainer supporting tangs.

Referring now to Figure 18 there is illustrated a modified construction in which the elongated retainer member 100 is more positively retained against displacement, particularly under high speed operation. In this case, the core 110 has a channel wall 112 provided with an opening 114. The rearwardly bent tang 116 which supports the elongated retainer 100, extends through the opening 114 so as to provide additional support. If further additional support is required, the free end of the tang 116 may be bent over a side of the opening 114 as indicated at 118.

It will be appreciated that where the retainer supporting tang extends through the array of filler material as indicated in Figure 18, the filler material is separated thereby into tufts. However, the present invention has as an additional advantage that if desired the filler material may extend substantially uniformly and continuously along the core, the separation by tangs into tufts being at widely spaced points. Moreover, tangs may be very narrow so that the separation into tufts is negligible. Thus, the present invention permits the production of a brush strip characterized by the uniform distribution of filler therealong and accurate control of filler density and distribution.

The present invention however, may be carried out by a construction which provides tufts which are entirely separated from each other at their folded or doubled end.

Figure 19:
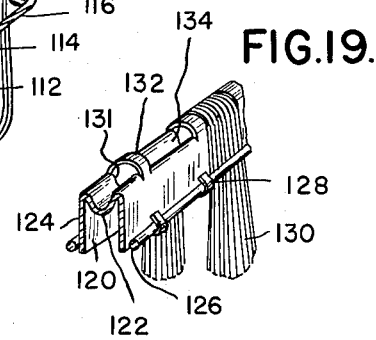
Figure 19 is a fragmentary perspective view illustrating a design of tufted brush.

Referring now to Figure 19 there is illustrated a modified construction in which the core 120 is of channel shape having a bottom wall 122 and side walls 124. Elongated elements 126 are retained in position by reversely bent tangs 128. In this case the tangs 128 are proportioned and positioned to extend through the array of filler material so as to separate the filler material into independent tufted portions 130 at their operating end. However, the core itself is modified so as to provide for actual separation between the folded or doubled portions of the filler material. For this purpose the bottom wall 122 of the core may be provided with transverse cuts 131. The material of the bottom wall between adjacent pairs of transverse cuts 131, which are in alignment with pairs of tangs 128, extends upwardly in a curved arch as indicated at 132. Intermediate the arches 132 thus provided, the material of the bottom wall is formed inwardly, as indicated at 134, and the folded or doubled ends of the filler material overlies the inwardly formed portions 134 and is separated into tufts by the outwardly arched portions 132.

Figure 20:
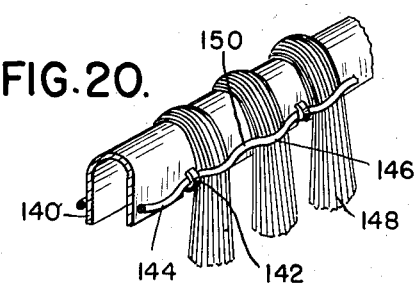
Figure 20 is a fragmentary perspective view illustrating a modified design for obtaining a tufted brush.

Referring now to Figure 20 there is illustrated a modified construction also providing a tufted form of brush. In accordance with this embodiment of the invention the core 140 is of channel shape and is provided with retainer supporting tangs 142 which may be relatively widely separated. The tangs 142 support a substantially stiff or rigid elongated retainer 144 which is of sinuous shape having outwardly extending curved portions 146 adapted to receive and locate a tuft of filler material 148. Intermediate the outwardly curved retainer portions 136, the retainer extends inwardly as indicated at 150 into contact with the outer side wall of the channel shaped core to separate the filler material into tufts. An equivalent result could of course be obtained by employing a straight retainer member and forming transversely extending tuft receiving pockets in the side walls of the channel shaped core 140, or both the side walls of the channel and the retainer may be formed to provide pockets for receiving the tufts.

Figure 22:
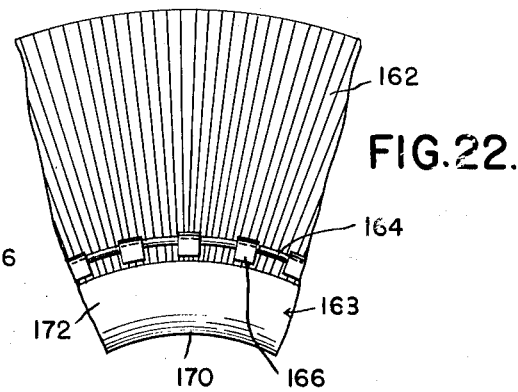
Figure 22 is a fragmentary elevational view of the construction shown in Figure 21.
Figure 21:
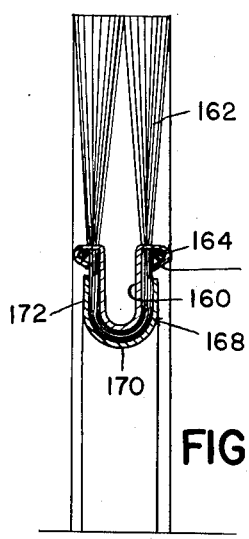
Figure 21 is a fragmentary elevation of a ring lock brush section.

Referring now to Figures 21 and 22 the manner in which the present invention may be employed to produce ring lock section brushes is illustrated. In these figures a channel shaped core 160 is provided which is formed into a circle. The filler material 162 is folded over the outside of the core 160 and is retained in place by elongated retainers 164 which in turn are clamped in position by reversely bent tangs 166. It will be appreciated that the construction thus far described may be modified in accordance with any of the preceding embodiments of the invention, and is merely illustrative of the specific construction of core and retainer.

An annular ring 168 is provided which is of channel shaped cross-section, having a bottom wall 170 overlying the folded or doubled portion of the filler material 162, and side walls 172 which extend along the portions of the filler material adjacent the folded or doubled portion thereof. If desired, the free edges of the ring 160 may engage the free edges of the reversely bent tangs 166 and serve to lock them in place.

In the brush illustrated in Figures 21 and 22 the core 160 may if desired be bent to circular shape from an initially straight section. However, the invention also contemplates the provision of a core 160 as illustrated in these figures, formed from ring stock so as to be endless. The ring lock 170 will normally be provided in the form of a tube inserted through the brush construction and the side walls 172 are thereafter formed into the relationship illustrated in the figures.

The brush illustrated herein may be conveniently manufactured by a continuous process in which the filler material is wound simultaneously around two strips, after which the filler material is separated intermediate the strips to provide two brushes. Instead of employing two of the cores or strips, the filler material may be wound about one strip using a dummy holder.

One of the important advantages of the present invention is the possibility of exercising accurate control of the spacing and density of the filler material by continuous winding. Thus, the filler material may be applied at a desired density which may be accurately controlled, and all of the filler elements may be provided to extend strictly perpendicular to the supporting section. The brush has the further advantage that the filler material is not injured during the clamping thereof to the core which has been a serious objection in some previous types of brushes. The present invention provides a rounded or circular cross-section retainer which is urged into pressure contact with the filler material, thus avoiding the possibility of pinching off or cutting some of the filler elements.

Brushes constructed in accordance with the foregoing disclosure may be operated at speeds greatly in excess of those previously permitted, without the possibility of the brush coming apart. Moreover, a well balanced brush is possible due to the accurate control over the distribution of filler permitted by the present invention. The brush furthermore, may be accurately centered, thus further contributing to its dynamic balance. The brush elements may be built up into many sections as desired, the herein disclosed construction permitting wide variations in detail design.

The drawings and the foregoing specification constitute a description of the improved brush in such full, clear, concise and exact terms as to enable any person skilled in the art to practice the invention, the scope of which is indicated by the appended claims.

What I claim as my invention is:

1. A brush comprising an elongated core having sides, a front edge and a back, filler material elements doubled over the back of said core, separate elongated retainers at the opposite sides of said core adjacent its front edge clamping the filler material elements against the opposite sides of said core, and tangs on the front edge of said core bent rearwardly and extending around the retainers to secure the retainers in place and to press the retainers against the filler material elements.

2. A brush as defined in claim 1 in which the core is channel-shaped with the bottom wall of the channel constituting the back of said core.

3. A brush as defined in claim 2 in which the back of said channel has outward proejctions in alignment with pairs of tangs to separate the filler into tufts.

4. A brush as defined in claim 3, the outward projections being separated by portions of the channel in which its bottom wall is formed inwardly.

5. A brush as defined in claim 1 in which said retainers are substantially rigid elongated members of rounded cross-section.

6. A brush as defined in claim 1 in which said retainers are wires.

7. A brush as defined in claim 1, said core having openings therethrough spaced inwardly from its front edge, the free end of said tangs extending into said openings.

8. A brush as defined in claim 7, the ends of said tangs extending through said openings being crimped over to interlock therein.

9. A brush as defined in claim 1 in which said core comprises a single strip having one edge reversely bent to provide a rounded back, and in which said tangs are disposed to extend laterally outwardly alternately in opposite directions.

10. A brush comprising an elongated metal channel having side walls and a bottom wall connecting said side walls, filler elements folded over the outside of said channel, wire retainers located at the outside of said channel adjacent the free edges of said channel side walls and disposed to press the adjacent portions of said filler elements against the outside of said side walls, and retainer securing tangs extending outwardly from the side walls of said channel around said wire retainers.

11. A brush as defined in claim 10 in which the side walls of said channel and said retainers are cooperatively shaped to define a series of tuft receiving pockets.

12. A brush as defined in claim 10 in which said wire retainers are sinuously shaped to separate the filler elements into tufts.

13. A brush as defined in claim 10, the side walls of said channel converging inwardly from the bottom wall thereof to provide spaced rows of filler elements converging at the free ends thereof.

14. A brush as defined in claim 10, the side walls of said channel diverging outwardly from the bottom wall thereof to provide spaced rows of filler material diverging at the free ends thereof.

15. A brush as defined in claim 10 in which said channel is bent into circular form, and a continuous lock ring of channel cross-section is provided over the folded portions of said filler material with outwardly extending flanges overlying portions of said filler material adjacent the folded portions thereof.

References Cited in the file of this patent

UNITED STATES PATENTS

| 656,761 | Adams | Aug. 28, 1900 |
| 1,380,381 | Herold | June 7, 1921 |
| 1,722,479 | Nickels | July 30, 1929 |

FOREIGN PATENTS

| 304,358 | Great Britain | Jan. 21, 1929 |
| 137,987 | Switzerland | June 2, 1930 |